(12) United States Patent
Klonowski et al.

(10) Patent No.: US 12,391,124 B2
(45) Date of Patent: Aug. 19, 2025

(54) HYBRID-ELECTRIC PROPULSION ARCHITECTURE AND METHOD FOR DISSIPATING ELECTRICAL ENERGY IN SUCH AN ARCHITECTURE

(71) Applicant: SAFRAN HELICOPTER ENGINES, Bordes (FR)

(72) Inventors: Thomas Klonowski, Moissy-Cramayel (FR); Thomas Michel Andre Gerard Barraco, Moissy-Cramayel (FR); Camel Serghine, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 274 days.

(21) Appl. No.: 17/433,545

(22) PCT Filed: Feb. 24, 2020

(86) PCT No.: PCT/FR2020/050343
§ 371 (c)(1),
(2) Date: Aug. 24, 2021

(87) PCT Pub. No.: WO2020/174165
PCT Pub. Date: Sep. 3, 2020

(65) Prior Publication Data
US 2022/0153423 A1 May 19, 2022

(30) Foreign Application Priority Data
Feb. 26, 2019 (FR) ...................................... 1901979

(51) Int. Cl.
*B64D 27/24* (2024.01)
*B60L 53/24* (2019.01)
(Continued)

(52) U.S. Cl.
CPC .............. *B64D 27/24* (2013.01); *B60L 53/24* (2019.02); *B60L 58/10* (2019.02); *B60L 58/12* (2019.02);
(Continued)

(58) Field of Classification Search
CPC .. B60L 53/24; B64D 2027/026; B60W 10/24; B60W 10/26; B60W 20/13; B60W 20/14
See application file for complete search history.

(56) References Cited

U.S. PATENT DOCUMENTS

| 10,450,080 B1* | 10/2019 | Beach | B64D 27/10 |
| 2008/0196424 A1* | 8/2008 | Shah | B60H 1/00785 62/150 |

(Continued)

FOREIGN PATENT DOCUMENTS

| DE | 102010031540 A1 | 1/2012 |
| EP | 2684798 A1 | 1/2014 |
| FR | 3056555 A1 | 3/2018 |

OTHER PUBLICATIONS

International Search Report and Written Opinion received for PCT Patent Application No. PCT/FR2020/050343, mailed on Jun. 3, 2020, 22 pages (9 pages of English Translation and 13 pages of Original Document).

*Primary Examiner* — Ashesh Dangol
(74) *Attorney, Agent, or Firm* — Womble Bond Dickinson (US) LLP

(57) ABSTRACT

A hybrid/electric propulsion architecture for a multi-rotor rotary wing aircraft, including an electricity generator driven by an internal combustion engine, and configured to operate in motor mode, a rectifier configured to convert an alternating current delivered by the electricity generator into direct current, an electrical network including a high voltage direct current (HVDC) bus, electrical energy storage means connected to the electrical network, during electrical energy (Continued)

regeneration on the HVDC bus, depending on the state of charge of the storage means: the storage means are configured to recover electrical energy, the storage means and the rectifier are configured to recover electrical energy, and the electricity generator operating in motor mode is configured to recover electrical energy.

10 Claims, 2 Drawing Sheets

(51) Int. Cl.
    *B60L 58/10*     (2019.01)
    *B60L 58/12*     (2019.01)
    *B64D 27/02*     (2006.01)
    *F03D 9/25*     (2016.01)

(52) U.S. Cl.
    CPC ............ *F03D 9/25* (2016.05); *B60L 2200/10* (2013.01); *B64D 27/026* (2024.01); *F05B 2220/706* (2013.01)

(56) References Cited

U.S. PATENT DOCUMENTS

| | | | |
|---|---|---|---|
| 2016/0070266 A1* | 3/2016 | DiVito | H02J 7/345 307/9.1 |
| 2017/0291712 A1* | 10/2017 | Himmelmann | F01D 15/10 |
| 2018/0162379 A1 | 6/2018 | Mizuno et al. | |
| 2020/0162004 A1* | 5/2020 | Li | H02P 23/20 |

\* cited by examiner

HYBRID-ELECTRIC PROPULSION ARCHITECTURE AND METHOD FOR DISSIPATING ELECTRICAL ENERGY IN SUCH AN ARCHITECTURE

TECHNICAL FIELD OF THE INVENTION

The invention relates to a hybrid-electric propulsion architecture for a multi-rotor rotary wing aircraft, an aircraft comprising such a hybrid-electric propulsion architecture and a method for dissipating electrical energy in such a hybrid-electric propulsion architecture.

BACKGROUND

The prior art comprises, in particular the patent applications FR-A1-3 056 555, US-A1-2018/162379, US-A1-2016/070266, DE-A1-10 2010 031540 and EP-A1-2 684 798.

It is known from the prior art a hybrid propulsion architecture of an aircraft, commonly called series hybridization, with a thermoelectric power generation.

As shown in FIG. 1, a hybrid propulsion architecture 10 generally comprises:
an internal combustion engine 12,
an electric generator 14 coupled to the internal combustion engine so that in operation the internal combustion engine 12 drives the electric generator 14,
a rectifier 16 connected to the electric generator 14 and configured to convert an alternative current delivered by the electric generator 14 into a direct current,
means for converting 18a, 18b, 18c, 18d the direct current into alternative current,
an electrical network 20 connecting the rectifier 16 to the conversion means 18a, 18b, 18c, 18d,
electric motors 22a, 22b, 22c, 22d connected to the conversion means 18a, 18b, 18c, 18d so that in operation the conversion means 18a, 18b, 18c, 18d supply the electric motors 22a, 22b, 22c, 22d with alternative current, and
propellers 24a, 24b, 24c, 24d coupled to the electric motors 22a, 22b, 22c, 22d so that in operation the electric motors 22a, 22b, 22c, 22d drive the propellers 24a, 24b, 24c, 24d.

In addition, the electrical network 20 typically comprises a high-voltage direct current (HVDC) bus.

The architecture 10 may also comprise a storage unit 26, for example a battery, to absorb the excess of electrical energy from the HVDC bus or ensure an additional energy during transient phases. In particular, when there is a return of electrical energy on the HVDC bus, the storage unit 26 absorbs this excess of electrical energy to protect the components of the HVDC bus.

In such an architecture, from a source of fossil fuel, the internal combustion engine 12, and via a mechanical-electrical conversion, by the electric generator 14, an electrical propulsion chain composed of the conversion means 18a, 18b, 18c, 18d, the electric motors 22a, 22b, 22c, 22d and the propellers 24a, 24b, 24c, 24d allows to fly an aircraft with rotating multi-wings.

An aircraft comprising such a hybrid propulsion architecture is multi-rotor, which allows to provide additional degrees of freedom, compared to the conventional aircrafts, with respect to the controllability of the aircraft, for example the braking, the avoidance strategy, the change of direction, or the tilting of the rotors.

However, such an architecture has a significant on-board mass, and it is necessary to ensure an electrical risk management in the particular context of the on-board aeronautical environment.

Indeed, this architecture must necessarily integrate electrical equipment, which are heavy and imposing, to allow a good regulation of the HVDC bus of the electrical network 20 and a good stability.

The hybrid propulsion architecture 10 of FIG. 1 also comprises an energy recovery system 28 on the HVDC bus of the electrical network 20. The energy recovery system 28 is generally used when the storage unit 26 is fully charged, and in transient, so-called "regeneration" phases, i.e., when there is a return of electrical energy from loads located downstream back to the storage unit 26 and the electric generator 14 coupled to the internal combustion engine 12. In particular, this occurs when a propeller 24a, 24b, 24c, 24d brakes and rejects electrical energy onto the HVDC bus. In fact, this return of electrical energy occurs when the electromotive force generated in the electric motors 22a, 22b, 22c, 22d, known as the propulsion motors, is greater than the voltage of the HVDC bus and the conversion means 18a, 18b, 18c, 18d are reversible in current. The energy recovery system allows to provide a protection for the electronic components located upstream such as transistors. The energy recovery system 28 generally consists of an electrical resistor 30 that converts the electrical energy into thermal energy and a chopper 32 that allows to set a voltage threshold at which it is useful to absorb the voltage peak. This energy recovery system is therefore a dissipative circuit, since it allows a dissipation of the electrical energy in a calorific way.

However, the mass of this system can be relatively imposing and is dependent on the energy that will be dissipated.

The purpose of the invention is to provide a solution allowing to remedy at least some of these drawbacks.

In particular, the present invention provides an electrical energy management that allows the elimination of the energy recovery system of the prior art. The present invention therefore proposes to lighten the hybrid propulsion architecture by managing the electrical energy of the HVDC bus, so as to eliminate the electrical equipment used to dissipate the "overflow" of electrical energy on the HVDC bus, which would result in a dangerous rise in voltage for the static components, such as transistors, and the passive components, such as the filtering or decoupling capacitors.

SUMMARY OF THE INVENTION

To this end, the invention relates to a hybrid-electric propulsion architecture for a multi-rotor rotary wing aircraft, comprising:
an internal combustion engine,
an electric generator coupled to the internal combustion engine so that in operation the internal combustion engine drives the electric generator,
a rectifier connected to the electric generator and configured to convert an alternative current delivered by the electric generator into a direct current,
means for converting direct current into alternative current,
an electrical network connecting the rectifier to the conversion means, the electrical network comprising a high-voltage direct current (HVDC) bus,
electrical energy storage means connected to the electrical network in parallel with the electric generator, electric motors connected to the conversion means so that in operation the conversion means supply the electric motors with alternative current, propellers coupled to the electric motors so that in operation the electric motors drive the propellers, the architecture being characterized in that the electric generator is an engine-generator, and in operation the internal combustion engine drives the electric generator in generator mode, in that, during a regeneration of electrical energy on the high-voltage direct current bus of the electrical network, depending on the state of charge of the storage means, the storage means are configured to recover the electrical energy, in that, during a regeneration of electrical energy on the high-voltage direct current bus of the electrical network, depending on the state of charge of the storage means, the rectifier is configured to recover the electrical energy, and in that during a regeneration of electrical energy on the high-voltage direct current bus of the electrical network, depending on the state of charge of the storage means, the electric generator is configured to operate in a motor mode so that in operation the electric generator recovers the electrical energy.

Advantageously, the present invention allows an electrical energy system allowing the suppression of the energy recovery system of the prior art. Indeed, this architecture allows a good regulation of the HVDC bus of the electrical network and a good stability, without integrating an energy recovery system. The mass of the architecture according to the invention is therefore optimized, and does not depend on the electrical energy that will be dissipated.

In particular, unlike the architectures according to the prior art, the architecture according to the invention does not comprise an energy recovery system in the form of a resistive dissipation circuit. This advantageously allows to reduce the weight and the volume of the architecture according to the invention, such a circuit being generally very heavy and bulky.

According to an embodiment of the invention, when the state of charge of the storage means is less than 60%, the storage means are configured to recover the electrical energy; when the state of charge of the storage means is between 60% and 80%, the storage means and the rectifier are configured to recover the electrical energy; and when the state of charge of the storage means is greater than 80%, the electric generator operating in motor mode is configured to recover the electrical energy.

The electrical network can be bidirectional. In other words, the current can flow in both directions in the electrical network, for example from the rectifier to the electrical propulsion chains, or vice versa.

The conversion means may comprise one or a plurality of inverters.

The conversion means and the rectifier can be configured to be current reversible. This advantageously allows a power absorption on the HVDC bus, without necessarily needing a dissipative circuit.

The electric generator may be a synchronous electrical machine. Alternatively, the electric generator may be an asynchronous electrical machine.

The internal combustion engine may be configured to consume the electrical energy recovered by the electric generator operating in motor mode.

The invention also relates to a multi-rotor rotary wing aircraft, comprising a hybrid-electric propulsion architecture according to the invention.

The invention also relates to a method for dissipating electrical energy in a hybrid-electric propulsion architecture according to the invention, comprising the steps of:

a regeneration of electrical energy on the high-voltage direct current bus of the electrical network, an acquisition of the state of charge of the storage means, and a recovery of the regenerated electrical energy from the high-voltage direct current bus of the electrical network, and depending on the state of charge of the storage means:

the recovery of the regenerated electrical energy from the high-voltage direct current bus of the electrical network is carried out by the storage means, or the recovery of the regenerated electrical energy on the high-voltage direct current bus of the electrical network is carried out by the storage means and the rectifier, or the recovery of the electrical energy regenerated on the high-voltage direct current bus of the electrical network is carried out by the electric generator operating in motor mode.

According to an embodiment of the invention, during the step of recovering the regenerated electrical energy on the high-voltage direct current bus of the electrical network:

the recovery of the electrical energy is carried out by the storage means when the state of charge of the storage means is less than 60%, the recovery of the electrical energy is carried out by the storage means and the rectifier when the state of charge of the storage means is between 60% and 80%, the recovery of the electrical energy is carried out by the electric generator operating in motor mode when the state of charge of the storage means is greater than 80%.

In other words, when acquiring the state of charge of the storage means, when the state of charge of the storage means is low, for example less than 60%, the recovery of the electrical energy is carried out by the storage means. When acquiring the state of charge of the storage means, when the state of charge of the storage means is intermediate, for example between 60% and 80%, the recovery of the electrical energy is carried out by the storage means and the rectifier. When acquiring the state of charge of the storage means, when the state of charge of the storage means is high, e.g. above 80%, the recovery of the electrical energy is carried out by the electric generator operating in motor mode.

According to one embodiment of the invention, when the state of charge of the storage means is greater than 80%, prior to the step of recovering the electrical energy by the electric generator operating in motor mode, the method comprises a step consisting of a defluxing of the electrical motors. This advantageously allows to avoid the direct re-injection of the electrical energy.

According to one embodiment of the invention, when the state of charge of the storage means is greater than 80%, prior to the step of recovering the electrical energy by the electric generator operating in motor mode, the method comprises a step consisting of a recovering of the electrical energy by the rectifier.

According to an embodiment of the invention, when the state of charge of the storage means is greater than 80%, prior to the step of recovering electrical energy by the electric generator operating in motor mode, the method comprises a step consisting of an increase of the electrical voltage of the high-voltage direct current bus of the electrical network. This advantageously allows to avoid an increase in the electromotive force of the electric motors.

BRIEF DESCRIPTION OF FIGURES

The invention will be better understood and other details, characteristics and advantages of the present invention will become clearer from the following description made by way of non-limiting example and with reference to the attached drawings, in which.

The elements having the same functions in the different implementations have the same references in the figures.

DETAILED DESCRIPTION OF THE INVENTION

Figure 1:
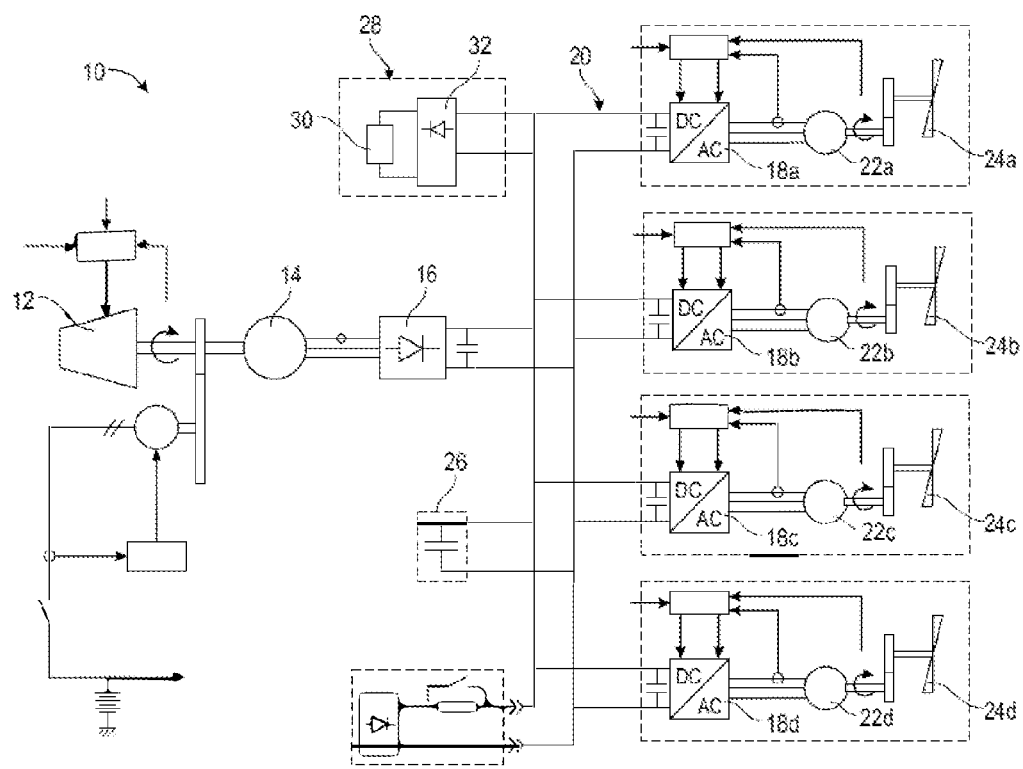
FIG. 1 represents a hybrid-electric propulsion architecture of an aircraft according to the prior art.
Figure 2:
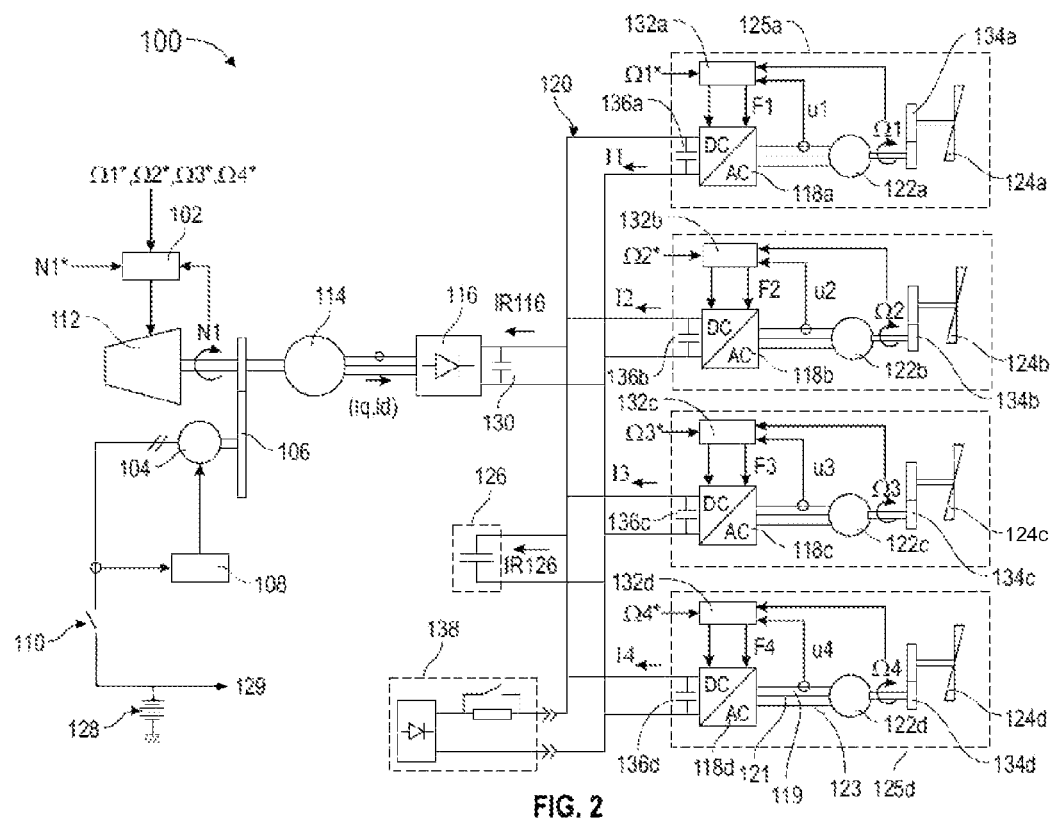
FIG. 2 represents a hybrid-electric propulsion architecture of an aircraft according to the invention.

FIG. 2 represents a hybrid-electric propulsion architecture 100 of an aircraft, for example of the helicopter or airplane type, with a multi-rotor rotary wing according to the invention. For example, the architecture 100 can be integrated into an aircraft weighing less than 5000 kg, with an on-board mechanical power of between 50 kW and 2000 kW.

An internal combustion engine 112, such as a turbomachine, for example an Auxiliary Power Unit (APU), is coupled to an electric generator 114. In operation, the electric generator 114 is driven by the internal combustion engine 112.

The electric generator 114 is a motor-generator, i.e., it is adapted to operate in both generator mode and motor mode. In other words, the electric generator 114 may operate in generator mode, in particular when driven by the internal combustion engine 112, or in motor mode. The electric generator 114 may be a synchronous or asynchronous electrical machine. Thus, the electric generator 114 is a reversible electrical machine. The electric generator 114 allows to provide a bidirectional mechanical-to-electrical energy conversion, i.e., a mechanical-to-electrical conversion and an electrical-to-mechanical conversion. The electric generator 114 may generate a polyphase electrical current, for example a three-phase current as shown in FIG. 2.

The rotational speed N1 of the rotor shaft of the internal combustion engine 112 connected to the electric generator 114 can be controlled by control means 102 (EECU, Electronic Engine Control Unit). These control means 102 may control parameters of the internal combustion engine 112, such as the fuel weight flow, noted WF, on the basis of the rotation speed N1 and other parameters, such as the frequency N1* of the electric generator 114 or an anticipation of the load $\Omega1^*$, $\Omega2^*$, $\Omega3^*$, $\Omega4^*$ for each electrical propulsion chain.

A starter 104 may be connected to the electric generator 114 by an auxiliary gearbox 106. The starter 104 provides, for example, a direct current of 28 V. A control unit 108 may control the starter 104. The starter 104 may be connected via a switch 110 to a battery 128, for example of 28 V in direct current. The switch 110 allows to connect the starter 104 to the battery 128, and thus to the network 129 of 28 V in direct current. A rectifier 116 is connected to an input to the electric generator 114 and configured to convert the alternative current delivered by the electric generator 114 into a direct current. The rectifier 116 may be current reversible. A capacitor 130 may be arranged in parallel with the electric generator 114.

An electrical network 120 connects in parallel an output of the rectifier 116 to inputs of conversion means 118a, 118b, 118c, 118d.

The conversion means 118a, 118b, 118c, 118d are configured to convert a direct current into an alternative current. The conversion means 118a, 118b, 118c, 118d may comprise direct current to alternative current converters.

The conversion means 118a, 118b, 118c, 118d may comprise inverters. In FIG. 2, DC means direct current and AC means alternative current. Each inverter may comprise three inverter arms respectively delivering the three phases 119, 121, 123 (referenced only for the conversion means 118d) of alternative current to each of the electric motors 122a, 122b, 122c, 122d.

The conversion means 118a, 118b, 118c, 118d, and in particular the inverters, may be current reversible. A capacitor 136a, 136b, 136c, 136d may be arranged in parallel with each of the conversion means 118a, 118b, 118c, 118d.

The electrical network 120 may be bidirectional, that is, the electrical current may flow from the rectifier 116 to the conversion means 118a, 118b, 118c, 118d, and in the opposite direction. Electric motors 122a, 122b, 122c, 122d are connected to the conversion means 118a, 118b, 118c, 118d. In operation, the electric motors 122a, 122b, 122c, 122d are supplied with alternative current by the conversion means 118a, 118b, 118c, 118d.

The electric motors 122a, 122b, 122c, 122d may be polyphase synchronous motors. These motors can be of different types, such as induction motors or variable reluctance motors. These motors can be of the single-stator or multi-rotor type. This advantageously allows to reduce the mass and the volume of the electric motors 122a, 122b, 122c, 122d.

The connection between the electric generator 114 and the electric motors 122a, 122b, 122c, 122d is operated in direct current, at a relatively high-voltage, so as to improve the stability of the electrical network 120 and the power management. The rectifier 116 thus allows to ensure the conversion of the alternative current delivered by the electric generator 120 into direct current, while the conversion means 118a, 118b, 118c, 118d ensure the conversion of this direct current into alternative current intended for the electric motors 122a, 122b, 122c, 122d.

Propellers 124a, 124b, 124c, 124d are coupled to electric motors 122a, 122b, 122c, 122d. In operation, the propellers 124a, 124b, 124c, 124d are driven by the electric motors 122a, 122b, 122c, 122d. The propellers 124a, 124b, 124c, 124d may be coaxial counter-rotating propellers.

In particular, the conversion means 118a, respectively 118b, 118c, 118d, the electric motor 122a, respectively 122b, 122c, 122d, and the propeller or the propellers 124a, respectively 124b, 124c, 124d, form an electrical propulsion chain 125a, respectively 125b, 125c, 125d. In FIG. 2, there are therefore four electrical propulsion chains 125a, 125b, 125c, 125d.

For each electrical propulsion chain 125a, 125b, 125c, 125d, the rotational speed $\Omega1$, $\Omega2$, $\Omega3$, $\Omega4$ of the shaft connecting the electric motor 122a, 122b, 122c, 122d and the propellers 124a, 124b, 124c, 124d, via a gearbox 134a, 134b, 134c, 134d, can be controlled by control means 132a, 132b, 132c, 132d. Similarly, the voltage U1, U2, U3, U4 from the conversion means 118a, 118b, 118c, 118d for supplying each electric motor 122a, 122b, 122c, 122d can be controlled by control means 132a, 132b, 132c, 132d. These control means 132a, 132b, 132c, 132d can control parameters of the conversion means 118a, 118b, 118c, 118d, such as the voltage U1, U2, U3, U4 of the electric motors 122a, 122b, 122c, 122d and the switching frequency set points (also referred to as duty cycles), noted F1, F2, F3, F4, based on the rotational speed Ω1, Ω2, Ω3, Ω4 and the voltage U1, U2, U3, U4 of the electric motors 122a, 122b, 122c, 122d, and other parameters, such as the anticipation of the load Ω1*, Ω2*, Ω3*, Ω4*.

Storage means 126 are connected to the electrical network 120 in parallel to the electric generator 114, so as to absorb an excess of electrical energy from the HVDC bus of the electrical network 120. The storage means 126 may also be configured to temporarily power the electric motors 122a, 122b, 122c, 122d by supplementing or substituting the electric generator 114. The storage means 126 may be of the electrochemical type, the electrostatic type, for example capacitive, or the mechanical type. In particular, the electrical energy storage means 126 may comprise one or a plurality of batteries, one or a plurality of capacitors, or one or a plurality of supercapacitors.

A pre-charge circuit 138 of the HDVC bus of the electrical network 120 may also be integrated so as to pre-charge the HDVC bus.

In order to be able to absorb the overvoltage on the HVDC bus of the electrical network 120, in particular during a braking phase of the propellers 124a, 124b, 124c, 124d, and thus to avoid the breakage for example of the capacitors of the HVDC bus and of the electronic components such as insulated gate bipolar transistors (IGBTs) or metal oxide semi-conductor field effect transistors (MOSFETs), a method for managing the transient phases is implemented.

Figure 3:
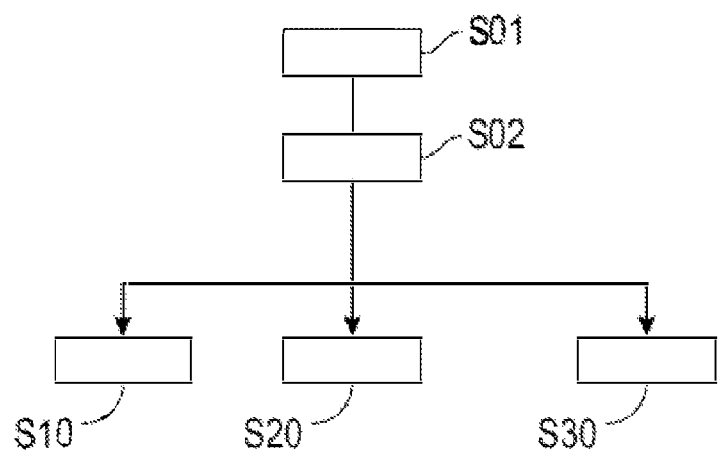
FIG. 3 is a flowchart of a method for dissipating electrical energy in a hybrid-electric propulsion architecture according to the invention.

As shown in FIG. 3, which represents the steps of a method for dissipating an electrical energy in an architecture 100 as described above, the management of the transient phases is a function of the state of charge of the storage means 126.

The step S01 represents a step of regenerating electrical energy on the HVDC bus of the electrical network 120. During this regeneration phase, an excess of electrical energy is emitted from at least one of the electrical propulsion chains 125a, 125b, 125c, 125d to the HVDC bus of the electrical network 120. On FIG. 2, this surplus of electrical energy is represented by the arrows I1, I2, I3, I4, corresponding to the electrical intensity respectively of each electrical propulsion chain 125a, 125b, 125c, 125d. Of course, only one, or several, or all of the electrical propulsion chains can regenerate electrical energy. The step S02 represents a step of acquiring the state of charge of the storage means 126. During this step S02, it is determined whether the state of charge of the storage means 126 is low, intermediate, or high.

A low state of charge of the storage means 126 may correspond to a state of charge of less than 40%, preferably less than 50%, and more preferably less than 60%.

An intermediate state of charge of the storage means 126 may correspond to a state of charge between 40% and 90%, preferably between 50% and 80%, and more preferably between 60% and 80%. Alternatively, the intermediate state of charge of the storage means 126 may be any value range between 40% and 90%, for example between 40% and 80%, or between 50% or 60% or 70% or 80% and 90%, or between 70% and 80%. A high state of charge of the storage means 126 may correspond to a state of charge of more than 80%, preferably more than 90%

The step S10 represents a step of recovering the regenerated electrical energy on the HVDC bus of the electrical network 120 by the storage means 126, and in particular only by the storage means 126. This step S10 is carried out when the state of charge of the storage means 126 is low, for example less than 60%. In particular, when the storage means 126 is in a state of charge of less than 60%, for example between 50% and 60%, the recovery of electrical energy may be carried out by the storage means 126, and in particular only by the storage means 126. In FIG. 2, this electrical energy recovery is represented by the arrow IR126.

For the absorption of high-frequency electrical power peaks, the storage means 126 advantageously comprise capacitive elements, of the super-capacitor type.

The step S20 represents a step of recovering the regenerated electrical energy on the HVDC bus of the electrical network 120 by the storage means 126 and the rectifier 116. This step S20 is carried out when the storage means 126 are in an intermediate state of charge, for example when the state of charge of the storage means 126 is between 60% and 80%.

This step S20 may also be carried out when the storage means 126 are in a thermal state that does not allow a full recharging of the storage means 126, i.e., when the storage means 126 are in a thermal state that risks unnecessary overheating of the elements constituting it.

This step S20 is a high frequency electrical energy management in order to allow a protection of the static components such as transistors. The term "high frequency" refers to frequencies at the level of the currents on the HVDC bus of the electrical network 120 being higher than 1 kHz.

The absorption of the overcurrent is achieved by the capacitive components integrated in the storage means 126 on the one hand, and via the rectifier 116 on the other hand. The rectifier 116 absorbs the overcurrent, denoted IR116 in FIG. 2, and converts it to a current with a large reactive component, i.e., to a current with a large change in the current Id received by the rectifier 116 from the electric generator 114 in the Park reference frame. This results in degrading the performance of the electric machine, formed by the electric generator 114, by degrading the power factor of the electric machine. This advantageously allows to absorb the excess of electrical energy by degrading the efficiency of the electrical machine, but without adding an energy recovery circuit as in the architectures according to the prior art.

The electrical machine, and thus the electric generator 114, may be a synchronous or asynchronous machine.

In the case of a synchronous machine, the degradation of the performance results in a voluntary defluxing, i.e. the magnetic field created in the stator is opposite to the magnetic field of the rotating magnets. This results in a magnetic loss and an increase in temperature at the level of the magnets of the synchronous machine. Moreover, in the case where the machine is said to be salient, the increase in the intensity Id in the generator increases the electromagnetic torque applied to the mechanical transmission by a few percent, the turbine thus contributing to the absorption of the excess of electrical power.

On an asynchronous machine, the performance degradation is due to an increase in slip, i.e. an increase in the difference between the rotation frequency of the asynchronous machine and the frequency of the stator currents (i.e. the frequency of the currents of the stator of the asynchronous machine). As the Joule losses in the rotor are proportional to the slip, this slip variation results in a rotor heating of the synchronous machine (i.e. a heating of the rotor of the synchronous machine) during long phases of electric power absorption.

The step S30 represents a step of recovering the electrical energy regenerated on the HVDC bus of the electrical network 120 by the electric generator 114 operating in motor mode. This step S30 is carried out when the storage means 126 are almost fully charged, or even fully charged, i.e. when the state of charge of the storage means 126 is high, for example above 80%, preferably above 90%.

This step S30 is also a high frequency electrical energy management.

When the electric motors 122a, 122b, 122c, 122d send back electrical energy to the HVDC bus of the electrical network 120, it means that the electric motors 122a, 122b, 122c, 122d have to brake very quickly, or that several electric motors are no longer driven, i.e. the torque set point of the electric motors is zero and their propeller is still rotating, and at the same time the other electric motors are, on the contrary, in full acceleration. This happens, for example, when the aircraft has to change direction, or in the case of an avoidance maneuver.

In this case, the electric motors 122a, 122b, 122c, 122d are defluxed, i.e. the intensity Id or Iq provided by the electric generator 114 is modified according to the angle of the mark, in order to decrease the electromotive force (known by the acronym EMF) and to directly avoid the re-injection of the electrical energy. However, the avoiding of the re-injection of the electrical energy is not always possible in some cases, for example when the electric motors 122a, 122b, 122c, 122d are already overheated preventing the defluxing, or if a decentralized control of the electric motors is used making the acquisition of the state of charge of the storage means 126 difficult. In this case, the electrical energy is performed by the electrical energy generation part of the architecture 100.

When the defluxing of the electric motors 122a, 122b, 122c, 122d is impossible or insufficient to avoid the re-injection, an electrical energy management strategy via the rectifier 116, as described above, may be associated therewith. In this case, the parameters of the management of the electrical energy can be the defluxing of the synchronous machine or a variation of the slip.

When the power peak is very high, the recovering of the electrical energy is carried out by the electric generator 114 operating in motor mode. Indeed, the quadrant of the electric generator 114 can be changed, by switching it to motor mode, which imposes a torque on the internal combustion engine 112, which thus becomes a consumer of electrical energy.

In addition, the voltage of the HVDC bus of the electrical network 120 may be increased, anticipating the set points on the electric motors 122a, 122b, 122c, 122d, and more specifically, increasing the rotational speed of the shaft of the rotor of the internal combustion engine 112 so as to guard against the increase in the electromotive force of the electric motors 122a, 122b, 122c, 122d. This also allows to reduce the Joule losses.

The invention claimed is:

1. A hybrid-electric propulsion architecture for a multi-rotor rotary wing aircraft, comprising:
    an internal combustion engine,
    an electric generator coupled to the internal combustion engine such that in operation the internal combustion engine drives the electric generator,
    a rectifier connected to the electric generator and configured to convert an alternative current delivered by the electric generator into a direct current,
    means for converting direct current into alternative current,
    an electrical network connecting the rectifier to the conversion means, the electrical network comprising a high-voltage direct current bus,
    electrical energy storage means connected to the electrical network in parallel to the electric generator,
    electric motors connected to the conversion means so that in operation the conversion means supply the electric motors with alternative current,
    propellers coupled to the electric motors so that in operation the electric motors drive the propellers,
    the architecture being characterized in that the electric generator is an engine-generator, and in operation the internal combustion engine drives the electric generator in generator mode,
    in that, during a regeneration of electrical energy on the high-voltage direct current bus of the electrical network, depending on a state of charge of the storage means, the storage means is configured to recover the electrical energy,
    in that, during the regeneration of electrical energy on the high-voltage direct current bus of the electrical network, depending on the state of charge of the storage means, the rectifier is configured to recover the electrical energy, by converting an overcurrent to a current with a reactive component degrading a power factor of an electric machine formed by the electric generator, wherein the electric machine is used only in said generator mode when said power factor is degraded,
    in that, during the regeneration of the electrical energy on the high-voltage direct current bus of the electrical network, depending on the state of charge of the storage means, the electric generator is configured to operate in a motor mode so that in operation the electric generator recovers the electrical energy,
    and in that, when the state of charge of the storage means is less than 60%, the storage means is configured to recover the electrical energy,
    when the state of charge of the storage means is between 60% and 80%, the storage means and the rectifier are configured to recover the electrical energy,
    and when the state of charge of the storage means is greater than 80%, the electric generator operating in the motor mode is configured to recover the electrical energy.

2. The architecture according to claim 1, wherein the conversion means and the rectifier are configured to be current reversible.

3. The architecture according to claim 1, wherein the electric generator is a synchronous or asynchronous electrical machine.

4. A multi-rotor rotary wing aircraft comprising the hybrid-electric propulsion architecture according to claim 1.

5. A method for dissipating electrical energy in the hybrid-electric propulsion architecture according to claim 1, comprising steps of:
    the regeneration of the electrical energy on the high-voltage direct current bus of the electrical network,
    an acquisition of the state of charge of the storage means, and a recovery of the regenerated electrical energy from the high-voltage direct current bus of the electrical network, and depending on the state of charge of the storage means:
the recovery of the regenerated electrical energy from the high-voltage direct current bus of the electrical network is carried out by the storage means, or
the recovery of the regenerated electrical energy from the high-voltage direct current bus of the electrical network is carried out by the storage means and the rectifier, or
the recovery of the electrical energy regenerated on the high-voltage direct current bus of the electrical network is carried out by the electric generator operating in the motor mode.

6. The method according to claim 5, wherein during the step of recovering the regenerated electrical energy from the high-voltage direct current bus of the electrical network:
the recovery of the electrical energy is carried out by the storage means when the state of charge of the storage means is less than 60%,
the recovery of the electrical energy is carried out by the storage means and the rectifier when the state of charge of the storage means is between 60% and 80%,
the recovery of the electrical energy is carried out by the electric generator operating in the motor mode when the state of charge of the storage means is greater than 80%.

7. The method according to claim 6, comprising, when the state of charge of the storage means is greater than 80% and prior to the step of recovering the electrical energy by the electric generator operating in the motor mode, a step consisting of a defluxing of the electrical motors.

8. The method according to claim 6, comprising, when the state of charge of the storage means is greater than 80% and prior to the step of recovering the electrical energy by the electric generator operating in the motor mode, a step consisting of a recovering of the electrical energy by the rectifier.

9. The method according to claim 6, comprising, when the state of charge of the storage means is greater than 80% and prior to the step of recovering the electrical energy by the electric generator operating in the motor mode, a step consisting of an increase of an electrical voltage of the high-voltage direct current bus of the electrical network.

10. A hybrid-electric propulsion architecture for a multi-rotor rotary wing aircraft, comprising:
an internal combustion engine,
an electric generator coupled to the internal combustion engine such that in operation the internal combustion engine drives the electric generator,
a rectifier connected to the electric generator and configured to convert an alternative current delivered by the electric generator into a direct current,
means for converting direct current into alternative current,
an electrical network connecting the rectifier to the conversion means, the electrical network comprising a high-voltage direct current bus,
electrical energy storage means connected to the electrical network in parallel to the electric generator,
electric motors connected to the conversion means so that in operation the conversion means supply the electric motors with alternative current,
propellers coupled to the electric motors so that in operation the electric motors drive the propellers,
the architecture being characterized in that the electric generator is an engine-generator, and in operation the internal combustion engine drives the electric generator in generator mode,
in that, during a regeneration of electrical energy on the high-voltage direct current bus of the electrical network, depending on a state of charge of the storage means, the storage means is configured to recover the electrical energy,
in that, during the regeneration of electrical energy on the high-voltage direct current bus of the electrical network, depending on the state of charge of the storage means, the rectifier is configured to recover the electrical energy by converting an overcurrent to a current with a reactive component degrading a power factor of an electric machine formed by the electric generator, wherein the electric machine is used only in said generator mode when said power factor is degraded,
in that, during the regeneration of electrical energy on the high-voltage direct current bus of the electrical network, depending on the state of charge of the storage means, the electric generator is configured to operate in a motor mode so that in operation the electric generator recovers the electrical energy, by changing a quadrant of the electric generator so that it imposes a torque on the internal combustion engine which becomes consumer of the electrical energy, and
in that, when the state of charge of the storage means is less than 60%, the storage means is configured to recover the electrical energy,
when the state of charge of the storage means is between 60% and 80%, the storage means and the rectifier are configured to recover the electrical energy,
and when the state of charge of the storage means is greater than 80%, the electric generator operating in the motor mode is configured to recover the electrical energy.

* * * * *